(12) United States Patent
Horiuchi et al.

(10) Patent No.: US 10,169,393 B2
(45) Date of Patent: *Jan. 1, 2019

(54) TRACKING CHANGES AMONG SIMILAR DOCUMENTS

(71) Applicant: International Business Machines Corporation, Armonk, NY (US)

(72) Inventors: Yoshio Horiuchi, Kanagawa-Ken (JP); Kenji Uchida, Tokyo (JP); Masaki Wakao, Kanagawa-Ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 473 days.

This patent is subject to a terminal disclaimer.

(21) Appl. No.: 14/943,654

(22) Filed: Nov. 17, 2015

(65) Prior Publication Data

US 2016/0350354 A1 Dec. 1, 2016

Related U.S. Application Data

(63) Continuation of application No. 14/168,233, filed on Jan. 30, 2014, now Pat. No. 9,275,020.

(30) Foreign Application Priority Data

Jan. 31, 2013 (JP) .................................. 2013-016345

(51) Int. Cl.
*G06K 9/00* (2006.01)
*G06F 17/30* (2006.01)
(Continued)

(52) U.S. Cl.
CPC .......... *G06F 17/30368* (2013.01); *G06F 8/71* (2013.01); *G06F 17/2211* (2013.01); *G06F 17/30011* (2013.01); *G06K 9/00442* (2013.01)

(58) Field of Classification Search
CPC .......... G06F 17/3011; G06F 17/30368; G06F 17/30; G06F 17/30249; G06F 7/20;
(Continued)

(56) References Cited

U.S. PATENT DOCUMENTS 6,732,090 B2 5/2004 Shanahan et al.
6,778,979 B2 8/2004 Grefenstette et al.
(Continued)

FOREIGN PATENT DOCUMENTS

JP H10222534 A 8/1998
JP 2002342317 A 11/2002
(Continued)

*Primary Examiner* — Amir Alavi
(74) *Attorney, Agent, or Firm* — Cantor Colburn LLP; Maeve Carpenter

(57) ABSTRACT

In one embodiment, an information processing apparatus includes a calculation section, an identification section, and a notification section. The calculation section is configured to calculate similarity among a plurality of documents. The identification section is configured to identify, in response to a change made to a first document, a second document having a similarity greater than or equal to a first criterion as compared to the first document before the change. The notification section is configured to notify a user of the identified second document that the first document has been changed, in response to the change to the first document.

19 Claims, 7 Drawing Sheets

(51) Int. Cl.
*G06F 17/22* (2006.01)
*G06F 8/71* (2018.01)

(58) Field of Classification Search
CPC .......... G06F 8/71; G06F 9/44; G06F 17/2211;
G06K 9/00087; G06K 9/00483; G06K
9/6201; G06K 9/6407; G06K 9/2009;
G06K 9/6423; G06T 7/001
See application file for complete search history.

(56) References Cited

U.S. PATENT DOCUMENTS

| | | | |
|---|---|---|---|
| 7,133,862 B2 | 11/2006 | Hubert et al. | |
| 7,814,105 B2 | 10/2010 | Knepper et al. | |
| 8,826,430 B2 | 9/2014 | Brdiczka et al. | |
| 9,626,553 B2* | 4/2017 | Sato | G06K 9/00288 |
| 2002/0101450 A1 | 8/2002 | Magendanz et al. | |
| 2004/0019499 A1 | 1/2004 | Murashita | |
| 2004/0083244 A1 | 4/2004 | Muecklich et al. | |
| 2005/0234887 A1 | 10/2005 | Harako | |
| 2007/0101256 A1 | 5/2007 | Simonyi et al. | |
| 2007/0112867 A1 | 5/2007 | Evans et al. | |
| 2010/0057734 A1* | 3/2010 | Miyajima | G06F 17/30743 707/E17.009 |
| 2010/0245898 A1* | 9/2010 | Nakai | H04N 1/00846 358/1.15 |
| 2013/0077874 A1* | 3/2013 | Suzuki | H04N 1/00336 382/218 |
| 2013/0212100 A1 | 8/2013 | Hajaj et al. | |
| 2014/0212053 A1* | 7/2014 | Horiuchi | G06F 17/2211 382/218 |
| 2014/0358973 A1 | 12/2014 | Roman | |
| 2015/0154437 A1* | 6/2015 | Aoki | G06K 9/0008 382/124 |
| 2016/0300120 A1* | 10/2016 | Haas | G06K 9/6206 |
| 2016/0350354 A1* | 12/2016 | Horiuchi | G06F 17/2211 |

FOREIGN PATENT DOCUMENTS

| | | |
|---|---|---|
| JP | 2005250946 A | 9/2005 |
| JP | 2005301859 A | 10/2005 |
| JP | 2006031292 A | 2/2006 |
| JP | 2009086814 A | 4/2009 |
| JP | 2009515264 A | 4/2009 |
| JP | 2009276862 A | 11/2009 |
| JP | 2010277572 A | 12/2010 |
| JP | 2011048639 A | 3/2011 |

* cited by examiner

TRACKING CHANGES AMONG SIMILAR DOCUMENTS

PRIORITY

This application is a continuation of U.S. patent application Ser. No. 14/168,233, filed Jan. 30, 2014, the disclosure of which is incorporated by reference herein in its entirety, which claims priority to Japanese Patent Application No. 2013-016345, filed 31 Jan. 2013, the content of which in its entirety is herein incorporated by reference, and all the benefits accruing therefrom under 35 U.S.C. 119.

BACKGROUND

The present invention relates to information processing apparatus and, more particularly, to handling changes to documents that are deemed similar to other documents, thereby maintaining document similar as needed.

There is an existing method for detecting a plurality of similar source codes included in a source file and making those source codes common to users, as indicated in Japanese Patent Literature JP2009-086814A. However, when one of such users modifies one of the plurality of similar source codes, the other source codes remain unmodified, which may result in errors. Such a problem occurs not only in source codes, but also among various other types of documents.

SUMMARY

In one embodiment, an information processing apparatus includes a calculation section, an identification section, and a notification section. The calculation section is configured to calculate similarity among a plurality of documents. The identification section is configured to identify, in response to a change made to a first document, a second document having a similarity greater than or equal to a first criterion as compared to the first document before the change. The notification section is configured to notify a user of the identified second document that the first document has been changed, in response to the change to the first document.

In another embodiment, a computer-implemented method includes calculating, by a computer processor, similarity among a plurality of documents. In response to a change made to a first document, a second document is identified having a similarity greater than or equal to a first criterion as compared to the first document before the change. A user of the identified second document is notified that the first document has been changed, in response to the change to the first document.

In yet another embodiment, a computer program product includes a computer readable storage medium having computer readable program code embodied thereon. The computer readable program code is executable by a processor to perform a method. The method includes calculating similarity among a plurality of documents. Further according to the method, in response to a change made to a first document, a second document is identified having a similarity greater than or equal to a first criterion as compared to the first document before the change. A user of the identified second document is notified that the first document has been changed, in response to the change to the first document.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DETAILED DESCRIPTION

Hereinafter, various embodiments of this disclosure will be described based in particular embodiments, but the following embodiments by no means limit the disclosure according to the scope of claims. Furthermore, all combinations of features described in the described embodiments are not necessarily essential to solutions to the problems of this disclosure.

Figure 1:
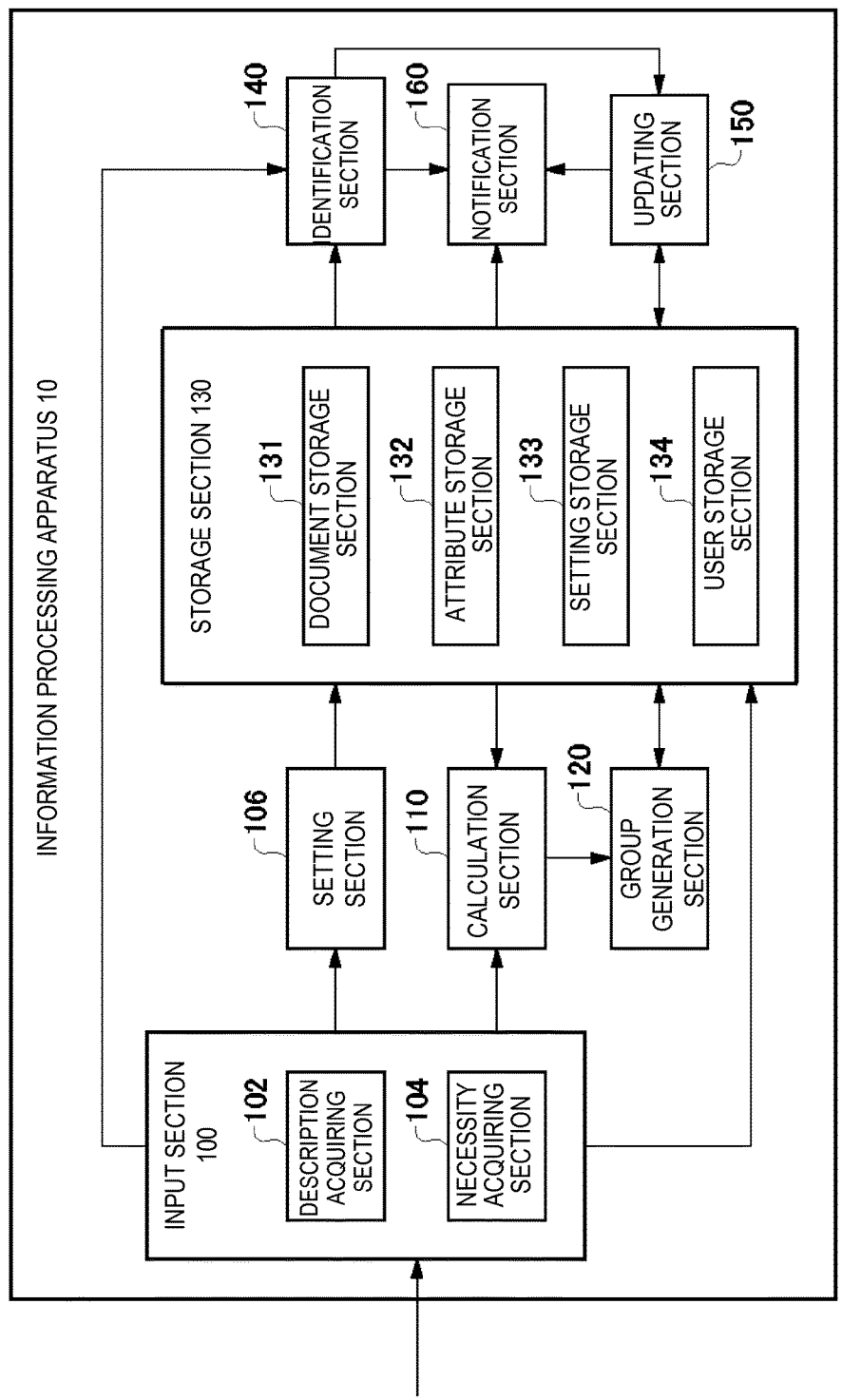
FIG. 1 is a block diagram of a configuration of an information processing apparatus, according to some embodiments of this disclosure.

FIG. 1 illustrates a configuration of an information processing apparatus 10, according to some embodiments. In the illustrated embodiment, the information processing apparatus 10 calculates similarity among documents, such as a plurality of source codes, and notifies other users of a change when one of the plurality of documents is changed. These other users (e.g., creator of a document, person in charge of review of the document, and/or a project manager who manages program development relating to the plurality of documents) may be those associated with other documents having high similarity to the one changed document before the change.

When, for example, a similar document is generated by citing from a first document and describing that first document, the information processing apparatus 10 may notify a person concerned with the first document that the similar document has been changed. The information processing apparatus 10 may be provided with an input section 100, a setting section 106, a calculation section 110, a group generation section 120, a storage section 130, an identification section 140, an updating section 150, and a notification section 160.

The input section 100 may receive a plurality of documents as input. In some embodiments, each of the plurality of documents includes a source code of a program. Each document may be an entire source file or may be part of a code of a source file (e.g., routine, function, or other given units). Alternatively, each of the plurality of documents may include text written in a natural language, or the like. The plurality of documents may contain a clone (e.g., a code clone in the case of a source code) created by copying or citing another document.

The input section 100 may store the plurality of documents inputted together with user information, such as names and mail addresses of respective users concerned with the plurality of documents in the storage section 130.

The input section 100 may receive as input a document changed by a user's editing. For example, in response to editing done on a first document (i.e., a changed document), from among the plurality of documents, the input section 100 may receive the changed document as input, supply the changed document to the calculation section 110 and the storage section 130, and notify the identification section 140 that the changed document has been changed. Furthermore, the input section 100 may receive a setting relating to the notification of the change and supply the setting to the setting section 106.

The input section 100 may further include a description acquiring section 102 and a necessity acquiring section 104. The description acquiring section 102 may acquire a descriptive text that describes changed contents of the changed document due to the change of the changed document from the user. The description acquiring section 102 may store the acquired descriptive text in the storage section 130. The necessity acquiring section 104 may acquire necessity information indicating whether other documents need to be changed due to the change in the changed document from the user. The necessity acquiring section 104 may store the acquired necessity information in the storage section 130.

The setting section 106 may receive an instruction as to whether to notify users associated with one or more second documents that were similar to the changed document before the change (referred to as "similar documents"). The setting section 106 may store a resulting setting based on that instruction in the storage section 130.

The calculation section 110 may read a plurality of documents from the storage section 130 and calculate similarity among the plurality of documents. The calculation section 110 may supply the calculated similarity among the plurality of documents to the group generation section 120.

The group generation section 120 may group two or more documents having similarity equal to or greater than a predetermined first criterion among the plurality of documents based on the similarity among the plurality of documents received from the calculation section 110. The group generation section 120 may store the similarity among the plurality of documents and information about the group to which each document belongs in the storage section 130.

The storage section 130 may store the information received from each element of the information processing apparatus 10 and supply the stored information to each element. The storage section 130 may be, for example, a main storage apparatus or auxiliary storage apparatus of the information processing apparatus 10, or a storage apparatus provided outside the information processing apparatus 10. The storage section 130 may include a document storage section 131, an attribute storage section 132, a setting storage section 133, and a user storage section 134.

The document storage section 131 may store the plurality of documents received from the input section 100. The attribute storage section 132 may store attributes of documents in association with the plurality of documents respectively, such that an attribute of a particular document is stored in association with that particular document. Here, as examples of attributes of a document, the attribute storage section 132 may store similarity among the plurality of documents, information on a group to which each document belongs, descriptive text inputted due to a change in a document, and necessity information indicating whether notification is necessary when a document is changed. The setting storage section 133 may store the setting received from the setting section 106. The user storage section 134 may store respective users associated with the plurality of documents received from the input section 100.

In response to the change made to the changed document, the identification section 140 may identify documents that belong to the same group as that of the changed document and identify documents having similarity equal to or greater than the predetermined first criterion to the changed document, before the change, among the documents belonging to the same group.

Furthermore, the identification section 140 may determine whether the changed document before the change and a similar document have sufficiently high similarity, or more specifically, whether the similarity between the changed document before the change and the similar document is equal to or greater than a second criterion that is higher than the first criterion. In accordance with the determination result, the identification section 140 may supply information on the identified similar document to the updating section 150 or the notification section 160.

Due to a change to a changed document having sufficiently high similarity to another document, the updating section 150 may automatically generate update information on the other, similar document. More specifically, the updating section 150 may receive the information on the similar document from the identification section 140 and generate an updated version of the similar document that reflects the change to the changed document in the similar document. The updating section 150 may store the updated version of the similar document in the document storage section 131 and supply update information indicating the update to the notification section 160.

The notification section 160 may receive the information on the identified similar document from the identification section 140 and notify users of the information. For example, the notification section 160 may acquire identifiers of users associated with the similar document from the user storage section 134 and notify those users of the change information on the changed document and information that identifies the similar document. Upon receiving the update information from the updating section 150, the notification section 160 may also notify the update information instead of the information on the similar document or the like.

Thus, the information processing apparatus 10 of some embodiments calculates similarity among a plurality of documents; identifies, in response to a change made to a changed document among the plurality of documents, similar documents having similarity to the changed document, before the change, equal to or greater than a first criterion and notify users associated with the similar documents that the change has been made to the changed document. This may allow the information processing apparatus 10 to prompt the users associated with the similar documents to change the similar documents in accordance with the change to the changed document.

Figure 2:
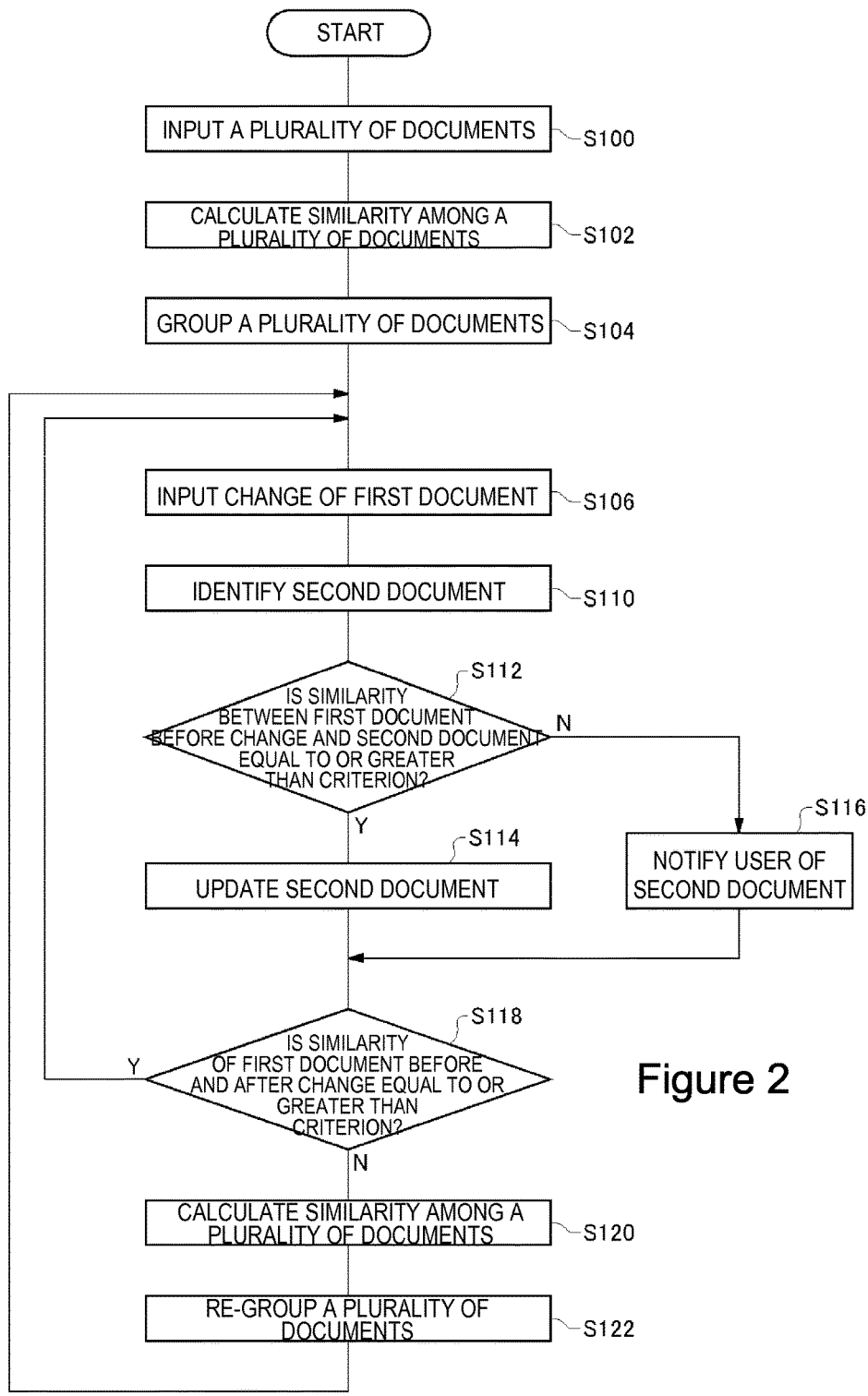
FIG. 2 is a diagram of a processing flow of the information processing apparatus, according to some embodiments of this disclosure.

FIG. 2 illustrates a processing flow of the information processing apparatus 10, according to some embodiments. The information processing apparatus 10 may be a management apparatus that manages one or a plurality of source files created in program development and performs processing from the illustrated blocks S100 to S122.

In block S100, the input section 100 may receive one or a plurality of source files managed by the information processing apparatus 10, as input as a plurality of documents, and detect at least some of a plurality of mutually similar source codes of the source files as the plurality of documents. More specifically, the input section 100 may detect a plurality of identical or similar character strings having at least a predetermined length from the one or plurality of source files, and thereby extract a plurality of similar ranges from the source files as a plurality of documents.

As an example, the input section 100 may receive source files of one or a plurality of programs as input and detect a plurality of similar or identical source codes as code clones, using a code clone detection tool such as CCFinder, from the source files. The input section 100 may store the plurality of detected source codes in the document storage section 131 as the plurality of documents.

Alternatively, the input section 100 may extract a routine or function, or the like, that is part of a source file as a unit and store the aggregate of these source codes as a plurality of documents. The input section 100 may store identities of users associated with the plurality of documents in the document storage section 131 together with the plurality of documents.

Furthermore, the setting section 106 may receive instructions as to whether to notify the users associated with documents similar to the changed document of the change via the input section 100 and may store the instructions in the setting storage section 133.

Next, in block S102, the calculation section 110 may calculate similarity among a plurality of documents. More specifically, the calculation section 110 may read a plurality of documents from the document storage section 131; calculate similarity among the plurality of documents based on the number or lengths, or both, of matching character strings among the plurality of documents; or command classes, functions and types, names of variables, or the like included in the plurality of documents. In this case, the calculation section 110 may also calculate similarity in accordance with similarity in the processing flow of a source code that becomes a document. The calculation section 110 may supply to the group generation section 120 the calculated similarity among the plurality of documents.

Next, in block S104, based on similarity among the plurality of documents received from the calculation section 110, the group generation section 120 may group two or more documents having similarity equal to or greater than the mutually predetermined first criterion among the plurality of documents.

For example, when similarity between document A and document B, similarity between document A and document C, and similarity between document B and document C are all equal to or greater than the predetermined first criterion, the group generation section 120 may perform grouping so that document A, document B, and document C belong to the same group. The group generation section 120 may store similarity among the plurality of documents and information on the group in the attribute storage section 132.

Next, in block S106, in response to a change made to a changed document among the plurality of documents, the input section 100 may receive the changed document as input. For example, the input section 100 may check an updated version of a source file and compare the updated version with the plurality of documents read from the document storage section 131. Thus, the input section 100 may detect documents corresponding to the plurality of documents included in the updated version. The input section 100 may receive as input the changed document in the updated version among the plurality of detected documents as the changed document.

Alternatively, the input section 100 may also directly receive a document, such as a changed source code, corresponding to one of the plurality of documents from the user as the changed document. The input section 100 may store the changed document in the document storage section 131 and notify the identification section 140 that a change has been made to the changed document.

Here, the description acquiring section 102 may also receive a descriptive text describing changed contents of the changed document. This descriptive text may, for example, be received from the user or acquired by extracting the descriptive text from the updated version of the source file. After the descriptive text is received, the description acquiring section may store it in the attribute storage section 132. Moreover, the necessity acquiring section 104 may acquire necessity information, indicating whether other documents need to be changed due to the change of the changed document, from the updated version of the source file or directly from the user, and may store the necessity information in the attribute storage section 132.

Next, in block S110, the identification section 140 may read information on the group and similarity associated with a plurality of documents stored in the attribute storage section 132, and may identify documents belonging to the same group as that of the changed document from among the plurality of documents. The identification section 140 may identify one or a plurality of similar documents, from among documents belonging to the same group as that of the changed document, having similarity to the changed document before the change, where that similarity is equal to or greater than the first criterion.

Next, in block S112, the identification section 140 may determine whether one or more similar documents exist having similarity equal to or greater than a second criterion, which is higher than the first criterion, to the changed document before the change. When one or more such documents exist, the identification section 140 may supply information on such a similar documents having similarity equal to or greater than the second criterion, along with other similar documents, to the updating section 150, and may then move the method to block S114.

When similarity among all identified similar documents and the changed document before the change is less than the second criterion, the identification section 140 may supply information on the similar documents to the notification section 160, and may move the method to block S116.

In block S114, the updating section 150 may receive the information on the similar documents from the identification section 140 and read the changed document and similar documents having similarity equal to or greater than the second criterion from the document storage section 131. The updating section 150 may make the same change to the read similar documents as that already made to the changed document.

Furthermore, for example, when the same processing flow is used between the changed document and the similar documents, but the names of variables used are different, the updating section 150 may apply the change that was made to the changed document, where the applied change uses the names of variables in the similar documents. The updating section 150 may thereby generate an updated version of the similar documents in which the change of the changed document is reflected.

The updating section 150 may store the updated version of the similar documents in the document storage section 131 and supply update information indicating to the notification section 160 that the similar documents have been updated. The notification section 160 may acquire the identities of users associated with the updated similar documents from the user storage section 134 and notify the users of the update information. Further, in some embodiments, the notification section 160 may acquire the identities of users associated with the not updated similar documents from the user storage section 134 and notify those users of the change of the changed document and information on the similar documents.

In block S116, the notification section 160 may receive the information on the identified similar documents from the identification section 140, acquire the identities of the users associated with the similar documents from the user storage section 134, and notify the users of the change of the changed document and information on the similar documents.

The notification section 160 may read a setting based on an instruction as to whether to notify the users associated with the similar documents of the change of the changed document from the setting storage section 133 and notify the users of the change of the changed document, or the like, on condition that no such setting is made that the users associated with the similar documents will not be notified of the change of the changed document. This may allow the notification section 160 to notify of the change of the changed document only when the creator of the changed document or other relevant party desires the notification.

Furthermore, the notification section 160 may read a descriptive text describing the changed contents of the changed document from the attribute storage section 132 and notify the users associated with the similar documents of the descriptive text. When the users associated with the similar documents change the similar documents, the information processing apparatus 10 may allow the users to refer to the changed contents of the changed document.

Furthermore, the notification section 160 may read necessity information from the attribute storage section 132, where that necessity information indicates whether other documents need to be changed due to the change of the changed document. The notification section 160 may notify the users associated with the similar documents of the necessity information. Thus, the information processing apparatus 10 may prevent the users associated with the similar documents from changing the similar documents without necessity for changing the similar documents.

Next, in block S118, the calculation section 110 may read the changed document before and after the change from the document storage section 131 and calculate similarity between the changed document before the change and the changed document after the change. The calculation section 110 may return the method to block S106 when the calculated similarity is equal to or greater than a predetermined third criterion, and may move the method to block S120 when the calculated similarity is less than the third criterion.

In block S120, the calculation section 110 may recalculate similarity among a plurality of documents including the changed document, after the change, in the same way as in block S102. The calculation section 110 may calculate similarity between the changed document and other documents and, in some embodiments, omit calculations of similarity among unchanged documents.

For example, when block S114 is executed, the calculation section 110 may calculate similarity between the changed document and other documents, as well as similarity between updated documents among the similar documents and other documents. When block S116 is executed, the calculation section 110 may calculate similarity between the changed document and other documents. The calculation section 110 may supply the calculated similarity among the plurality of documents to the group generation section 120.

Next, in block S122, the group generation section 120 may regroup two or more documents having similarity equal to or greater than the predetermined first criterion as compared to a plurality of documents including the changed document, after the change. This regrouping may be based on similarity among the plurality of documents received from the calculation section 110.

For example, when the changed document has similarity equal to or greater than the predetermined first criterion as compared to the documents making up a particular existing group, the group generation section 120 may add the changed document to that particular group.

As an example, suppose documents A, B, and C belong to a first group. Document D is changed and thereby has similarity equal to or greater than the predetermined first criterion as compared to all documents A, B, and C. As a result, the group generation section 120 may add document D to the first group composed of documents A, B, and C.

Furthermore, when the changed document has similarity equal to or greater than the predetermined first criterion as compared to some documents making up an existing group, the group generation section 120 may generate a new group composed of the changed document and the some documents.

As an example, suppose documents A, B, and C are included in a first group; similarity between changed document D and document A is equal to or greater than the first criterion; but similarity between document D as compared to documents B and C is less than the first criterion. In that case, the group generation section 120 may generate a new group composed of document A and document D.

Even when similarity of the changed document to other documents in the group to which the changed document, after the change, belongs is less than the predetermined first criterion, the group generation section 120 may still maintain the changed document as a document in the group.

For example, when document A, included in the same group as documents B and C, is modified, then the similarity between document B and document C remains equal to or greater than the predetermined first criterion. However, even when similarity between document A and document B or similarity between document A and document C becomes less than the first criterion, the group generation section 120 may maintain document A, document B, and document C as the same group.

Furthermore, when a set of documents belonging to a first group becomes a subset of a set of documents belonging to a second group as a result of regrouping, the group generation section 120 may delete the first group and integrate it into the second group. This may allow the information processing apparatus 10 to omit processing on the overlapping groups.

The group generation section 120 may store recalculated similarity among a plurality of documents and information on the regrouped group in the attribute storage section 132. Next, the information processing apparatus 10 may return the method to block S106.

Thus, by sending a notification to the users associated with the similar documents that similar to the changed document before the change, the information processing apparatus 10 may be able to prompt the users of the similar documents to make a change similar to that of the changed document.

Furthermore, the information processing apparatus 10 may determine whether the changed document before the change and the similar documents have similarity equal to or greater than the second criterion, which is greater than the first criterion. If these documents have similarity equal to or greater than the second criterion, the information processing apparatus 10 may change the similar documents so as to follow the change of the changed document. When these documents are quite similar, for example, when the changed document before the change is a copy of the similar documents, the information processing apparatus 10 may save the users of the similar documents time and trouble of changing the similar documents.

Furthermore, the information processing apparatus 10 of the present embodiment may omits recalculation of similarity between the changed document and some other documents in blocks S120 and S122, on condition that similarity of the changed document before and after the change is equal to or greater than the predetermined third criterion. When the change of the changed document is minor, the information processing apparatus 10 may thereby omit processing of regrouping and reduce the burden of processing.

Furthermore, in some embodiments, the information processing apparatus 10 may also maintain a document once incorporated in a group in the same group even when similarity to other documents in the group decreases. This allows the information processing apparatus 10 to keep linked together a plurality of documents originally highly associated with each other irrespective of the later change.

Furthermore, in some other embodiments, instead of or in addition to updating the similar documents in block S114 using the determination result in block S112 as a condition, the information processing apparatus 10 may update the similar documents in block S114 using the acquisition of the necessity information indicating that other documents need to be changed due to the change to the changed document in block S106 as a condition.

Furthermore, in some other embodiments, even upon determining in block S118 that similarity of the changed document before and after the change is equal to or greater than the third criterion, the information processing apparatus 10 may recalculate similarity between similar documents whose similarity to the changed document before the change falls within a range predetermined for the first criterion as compared to the changed document after the change. The information processing apparatus 10 may then regroup the changed document and other documents, and the similar documents and other documents.

For example, when similarity between at least some of the similar documents and the changed document before the change is equal to or greater than the first criterion, or within a set range of the first criterion (i.e., plus or minus a predetermined value), the calculation section 110 may recalculate similarity between at least some of the similar documents and the changed document after the change. In this way, when similarity between the changed document and the similar documents is in the vicinity of the first criterion and the group relationship between the changed document and the similar documents is likely to be changed due to the change of the changed document, the information processing apparatus 10 may then execute processing of grouping.

Figure 3:
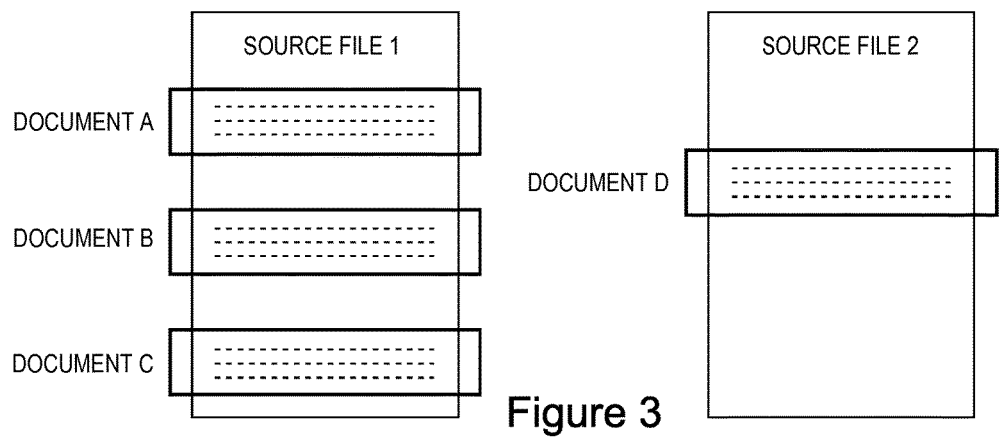
FIG. 3 illustrates an example of a plurality of documents processed by the information processing apparatus, according to some embodiments of this disclosure.

FIG. 3 illustrates an example of a plurality of documents processed by the information processing apparatus 10, according to some embodiments. As shown in FIG. 3, a plurality of documents A to D are a plurality of similar source codes, such as code clones included in a source file. The plurality of documents A to D may be included in a single source file or, as shown, may be included across a plurality of source files 1 and 2.

Figure 4:
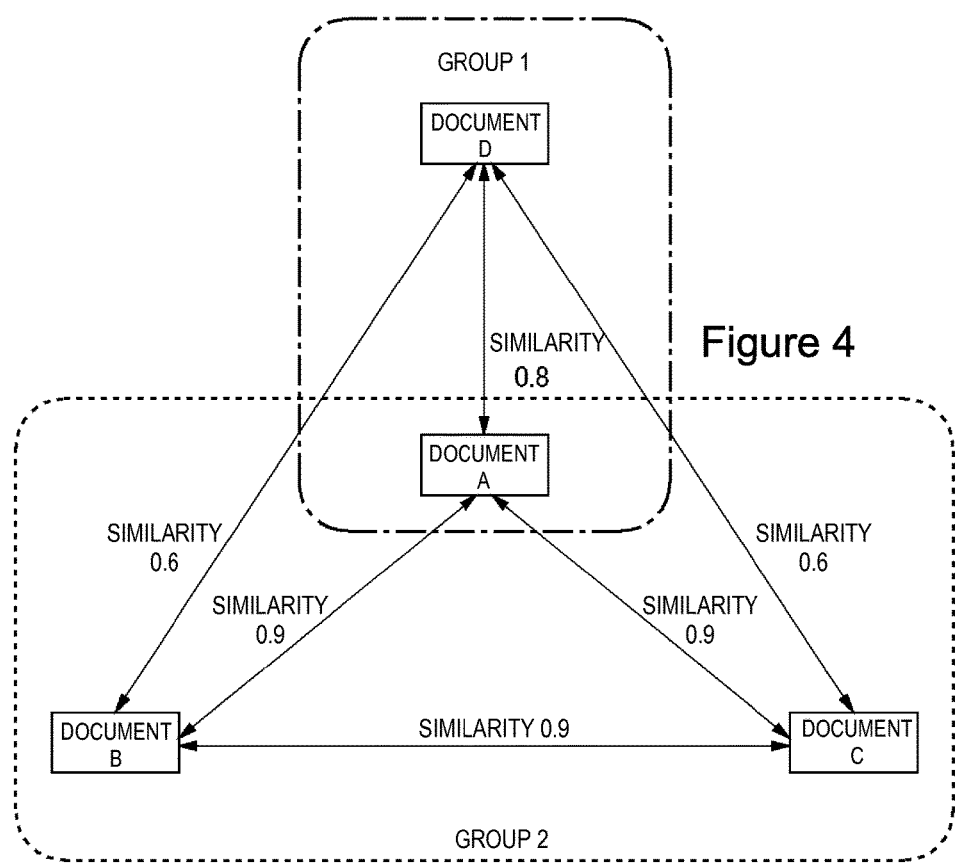
FIG. 4 illustrates an example of grouping by the information processing apparatus, according to some embodiments of this disclosure.

FIGS. 4 to 7 illustrate examples of notification and grouping by the information processing apparatus 10. As shown in FIG. 4, the information processing apparatus 10 may manage document A, document B, document C, and document D by storing them in the document storage section 131. Document A has similarity of 0.9 to documents B and C and similarity of 0.8 to document D. Document B has similarity of 0.9 to document C and similarity of 0.6 to document D. Document C has similarity of 0.6 to document D.

The information processing apparatus 10 uses, for example, similarity of 0.7 as a first criterion, groups documents A and D having similarity equal to or greater than this first criterion (group 1), and likewise document A, B and C having similarity equal to or greater than the first criterion (group 2).

Figure 5:
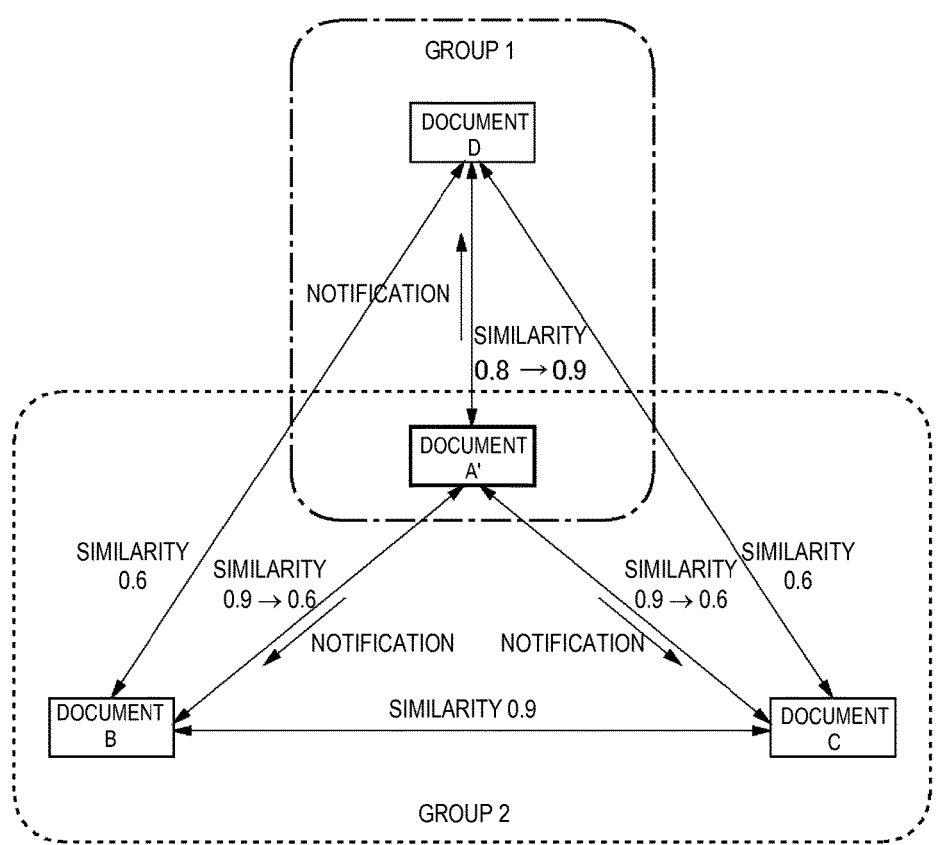
FIG. 5 illustrates an example of notification and re-grouping by the information processing apparatus, according to some embodiments of this disclosure.

FIG. 5 illustrates an example of notification and regrouping of the information processing apparatus 10 when document A is changed. In response to the change of document A, the notification section 160 notifies users associated with document B, document C and document D, each having similarity equal to or greater than the first criterion of 0.7 to document A before the change.

Furthermore, the calculation section 110 recalculates similarity of changed document A to document B, document C and document D. As a result, the calculation section 110 calculates similarity between document A and document B to be 0.6, calculates similarity between document A and document C to be 0.6, and calculates similarity between document A and document D to be 0.9.

The group generation section 120 uses similarity of 0.7 as a first criterion and maintains documents A and D whose recalculated similarity is equal to or greater than that first criterion as group 1. Here, although similarity between changed document A and documents B and C is 0.6, which is smaller than the first criterion, the group generation section 120 maintains documents A, B, and C, which belonged to the same group before the change of document A, as group 2.

Figure 6:
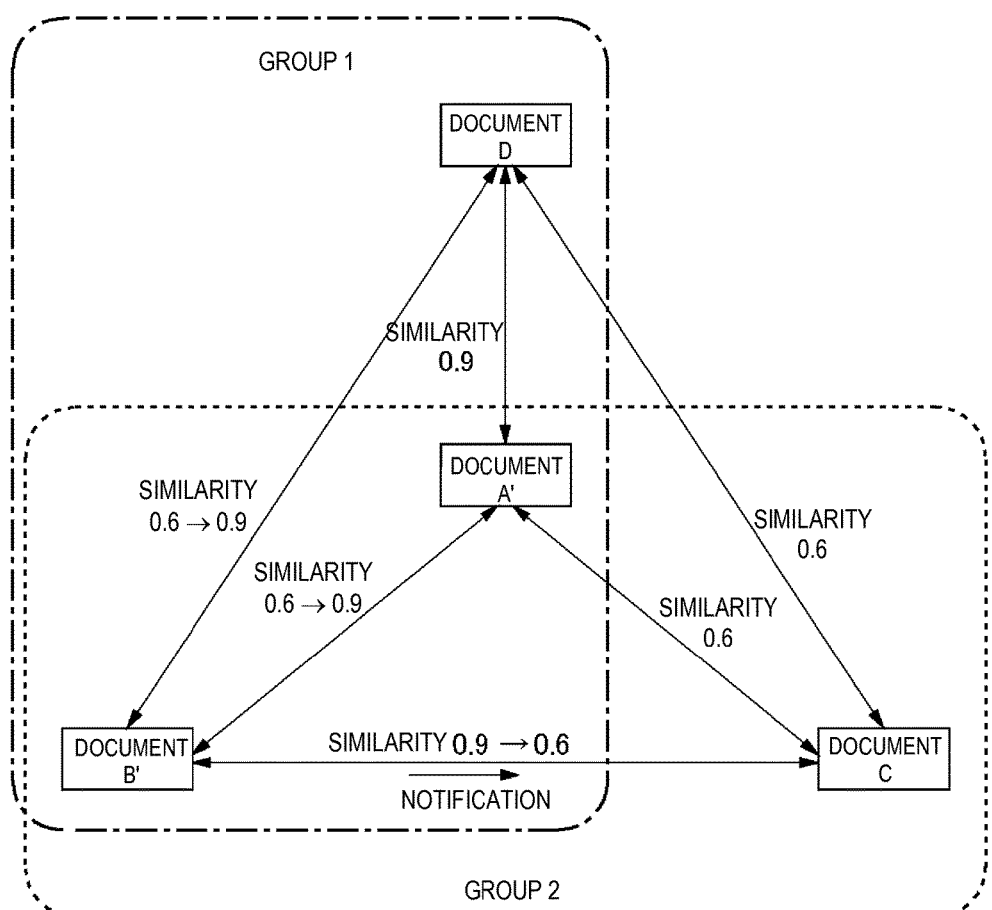
FIG. 6 illustrates another example of notification and re-grouping by the information processing apparatus, according to some embodiments of this disclosure.

FIG. 6 illustrates an example of further notification and regrouping of the information processing apparatus 10 when document B is changed. In response to the change of document B, the notification section 160 notifies the users associated with document C, having similarity equal to or greater than the first criterion of 0.7 to document B before the change, that document B has been changed. The information processing apparatus 10 does not notify the users of changed document A of the change of document B.

Furthermore, the calculation section 110 recalculates similarity of changed document B to document A, document C, and document D. As a result, the calculation section 110 calculates similarity between document B and document A to be 0.9, calculates similarity between document B and document C to be 0.6, and calculates similarity between document B and document D to be 0.9.

The group generation section 120 uses similarity of 0.7 as a first criterion and adds, when similarity among all documents A, B and D has become equal to or greater than the first criterion of 0.7, document B to group 1 composed of documents A and D. Furthermore, the group generation section 120 maintains documents A, B, and C, which belonged to the same group before the change of document B, as group 2.

Figure 7:
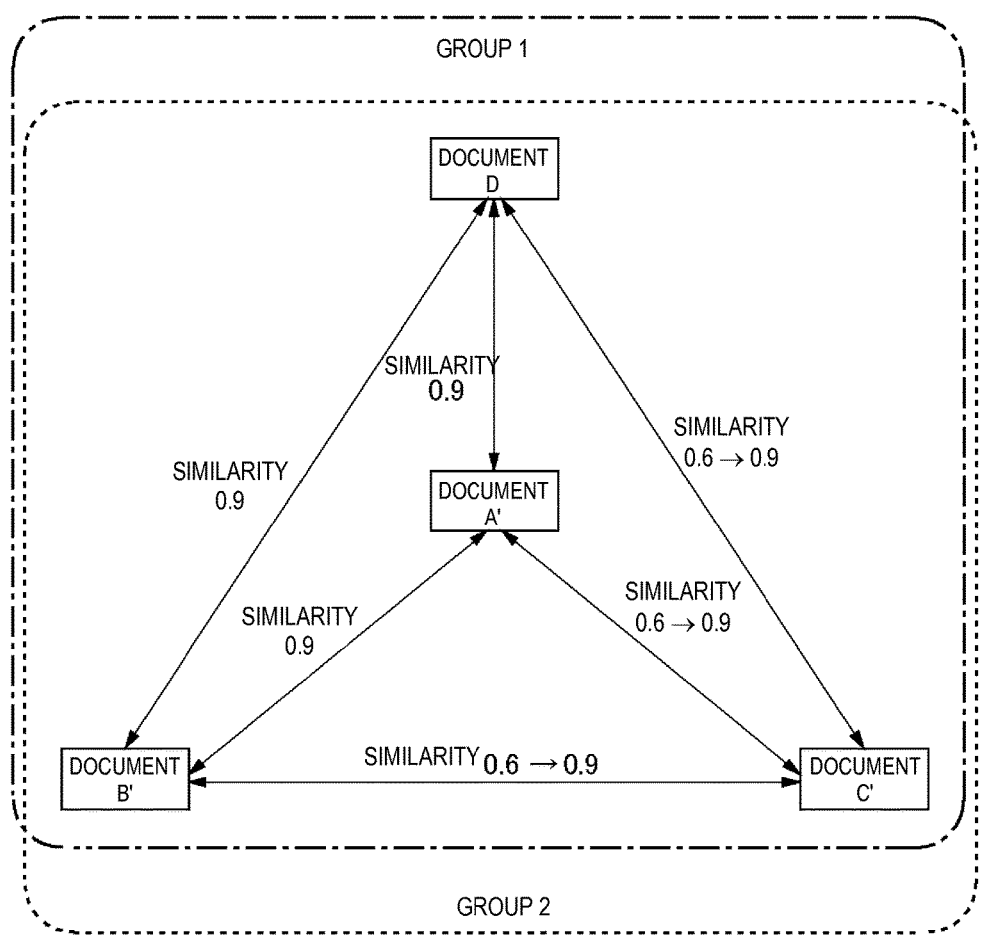
FIG. 7 illustrates a further example of notification and re-grouping by the information processing apparatus, according to some embodiments of this disclosure.

FIG. 7 illustrates an example of further notification and regrouping by the information processing apparatus 10 when document C is changed. Since there is no document having similarity equal to or greater than the first criterion of 0.7 to document C before the change, the notification section 160 notifies neither the users of changed document A nor the users of changed document B that document C has been changed.

The calculation section 110 recalculates similarity of changed document C to document A, document B, and document D. As a result, the calculation section 110 calculates similarity between document C and document A to be 0.9, calculates similarity between document B and document C to be 0.9, and calculates similarity between document B and document D to be 0.9.

The group generation section 120 uses similarity of 0.7 as the first criterion and adds document C to group 1, composed of documents A, B and D, when similarity among all documents A, B, C, and D has become equal to or greater than the first criterion of 0.7. The group generation section 120 also adds document D to group 2, which is composed of documents A, B and C. Here, since group 1 and group 2 have become the same set composed of documents A, B, C, and D, the group generation section 120 deletes group 1 from the attribute storage section 132 and integrates it into group 2.

Thus, the information processing apparatus 10 may notify users associated with similar documents that are similar to the changed document before the change. The information processing apparatus 10 may further thereby prevent notification of a change when the change is redundant.

Figure 8:
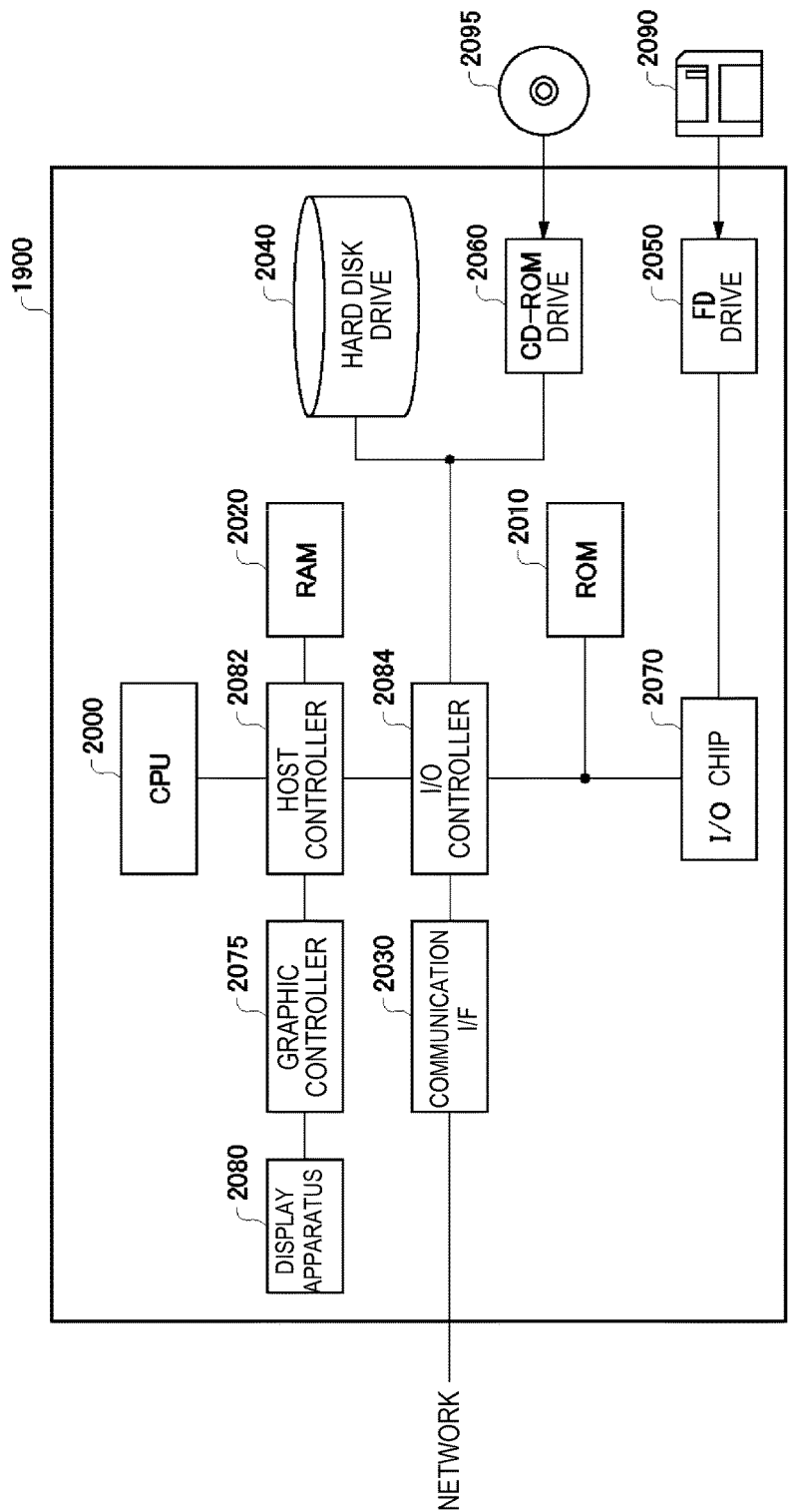
FIG. 8 illustrates an example of a hardware configuration of a computer, according to some embodiments of this disclosure.

FIG. 8 illustrates an example of a hardware configuration of a computer 1900 that functions as the information processing apparatus 10. The computer 1900 according to the present embodiment is provided with a CPU peripheral section including a CPU 2000, a RAM 2020, a graphic controller 2075 and a display apparatus 2080 mutually connected via a host controller 2082, an input/output section including a communication interface 2030, a hard disk drive 2040 and a CD-ROM drive 2060 connected to the host controller 2082 via an input/output controller 2084, and a legacy input/output section including a ROM 2010, a flexible disk drive 2050 and an input/output chip 2070 connected to the input/output controller 2084.

The host controller 2082 connects the RAM 2020, the CPU 2000 that accesses the RAM 2020 at a high transfer rate and the graphic controller 2075. The CPU 2000 operates based on programs stored in the ROM 2010 and the RAM 2020, and controls each section. The graphic controller 2075 acquires image data generated on a frame buffer provided by the CPU 2000, or the like, in the RAM 2020 and displays the image data on the display apparatus 2080. Alternatively, the graphic controller 2075 may also incorporate the frame buffer that stores image data generated by the CPU 2000 or the like.

The input/output controller 2084 connects the host controller 2082; the communication interface 2030, which is a relatively high speed input/output apparatus; the hard disk drive 2040; and the CD-ROM drive 2060. The communication interface 2030, wired or wirelessly, communicates with other apparatuses via a network. Furthermore, the communication interface functions as hardware for the input section 100, the updating section 150, and the notification section 160, or the like, to communicate with users outside the information processing apparatus 10. The hard disk drive 2040 stores programs and data used by the CPU 2000 in the computer 1900. The CD-ROM drive 2060 reads programs or data from a CD-ROM 2095 and provides the programs or data to the hard disk drive 2040 via the RAM 2020.

Furthermore, relatively low-speed input/output apparatuses such as the ROM 2010, the flexible disk drive 2050, and the input/output chip 2070 are connected to the input/output controller 2084. The ROM 2010 stores a boot program executed by the computer 1900 on start-up, and may also store programs or the like dependent on hardware of the computer 1900. The flexible disk drive 2050 reads a program or data from a flexible disk 2090 and provides the program or data to the hard disk drive 2040 via the RAM 2020. The input/output chip 2070 connects the flexible disk drive 2050 to the input/output controller 2084 and connects various input/output apparatuses to the input/output controller 2084 via, for example, a parallel port, a serial port, a keyboard port, a mouse port, or the like.

A program supplied to the hard disk drive 2040 via the RAM 2020 is stored in a recording medium such as the flexible disk 2090, the CD-ROM 2095, or an integrated circuit (IC) card and provided by a user. The program is read from the recording medium, installed in the hard disk drive 2040 in the computer 1900 via the RAM 2020, and executed by the CPU 2000.

A program installed in the computer 1900 to cause the computer 1900 to function as the information processing apparatus 10 may be provided with an input module, a description acquiring module, a necessity acquiring module, a setting module, a calculation module, a group generation module, an identification module, a notification module, and an updating module. These programs or modules may act on the CPU 2000 or the like to cause the computer 1900 to function as the input section 100, the description acquiring section 102, the necessity acquiring section 104, the setting section 106, the calculation section 110, the group generation section 120, the identification section 140, the updating section 150, and the notification section 160 respectively.

The information processing described in these programs are read into the computer 1900 to function as the input section 100, the description acquiring section 102, the necessity acquiring section 104, the setting section 106, the calculation section 110, the group generation section 120, the identification section 140, the updating section 150, and the notification section 160, which may be specific means implemented through cooperation between software and the aforementioned various hardware resources. A specific information processing apparatus 10 specialized for intended use may be constructed using these specific means to realize calculation or processing of information specialized for intended use of the computer 1900 according to this disclosure.

As an example, when the computer 1900 performs communication with an outside apparatus or the like, the CPU 2000 executes a communication program loaded on the RAM 2020 and instructs the communication interface 2030 to perform communication processing based on processing contents described in the communication program. Under the control of the CPU 2000, the communication interface 2030 reads transmission data stored in a transmission buffer region provided on the storage apparatus, such as the RAM 2020, the hard disk drive 2040, the flexible disk 2090, or the CD-ROM 2095, and transmits the transmission data to a network or writes received data received from the network into a reception buffer region provided on the storage apparatus. Thus, the communication interface 2030 may transfer transmission or reception data to or from the storage apparatus under a DMA (direct memory access) scheme, or alternatively, the CPU 2000 may read data from the storage apparatus or communication interface 2030, which is a transfer source, write data into the communication interface 2030 or storage apparatus, which is a transfer destination, and thereby transfer the transmission/received data.

Furthermore, the CPU 2000 reads a whole or necessary part of a file or database or the like stored in an outside storage apparatus such as the hard disk drive 2040, the CD-ROM drive 2060 (CD-ROM 2095), or the flexible disk drive 2050 (flexible disk 2090), into the RAM 2020 through DMA transfer or the like and performs various kinds of processing on the data in the RAM 2020. The CPU 2000 then writes back the processed data into the outside storage apparatus through DMA transfer or the like. Since the RAM 2020 can be assumed to temporarily store contents of the outside storage apparatus during such processing, the RAM 2020 and the outside storage apparatus or the like may be generically called memory, storage section, or storage apparatus. The RAM 2020 function, for example, as the storage section 130, the document storage section 131, the attribute storage section 132, the setting storage section 133, the user storage section 134, or a combination thereof. Information, such as various programs, data, tables, and databases, is stored in these storage apparatuses and is subject to information processing. The CPU 2000 can also retain part of the RAM 2020 in a cache memory and perform a read/write on the cache memory. In that case, since the cache memory takes on part of the function of the RAM 2020, some embodiments assume that the cache memory is also included in the RAM 2020, the memory, and/or the storage apparatus except in the case where the cache memory is described distinctively.

Furthermore, the CPU 2000 performs various kinds of processing, including various calculations specified by an instruction string of a program, processing on information, condition determination, search or substitution of information or the like on the data read from the RAM 2020, and the CPU 2000 writes back data into the RAM 2020. For example, when making a condition determination, the CPU 2000 determines whether various variables satisfy conditions such as being greater than, smaller than, greater than or equal to, or smaller than or equal to other variables or constants, and then branches to a different instruction string or invokes a subroutine when the condition is satisfied (or the condition is not satisfied).

Furthermore, the CPU 2000 can search information stored in a file or database or the like in the storage apparatus. For example, when a plurality of entries in which values of second attributes are associated with values of first attributes respectively are stored in the storage apparatus, the CPU 2000 searches for an entry in which the values of the first attributes match a specified condition from among the plurality of entries stored in the storage apparatus, reads the values of the second attributes stored in the entry, and can thereby obtain the values of the second attributes associated with the first attributes that satisfy the predetermined condition.

The above-described programs or modules may be stored in an outside recording medium. One or more of the following may be used as the recording medium, in addition to alternatively to the flexible disk 2090 or CD-ROM 2095: an optical recording medium such as DVD or CD; magneto-optic recording medium such as MO, tape medium; or semiconductor memory such as an IC card. Moreover, may also be possible to use a storage apparatus such as hard disk or RAM, provided on a server system connected to a private communication network or the Internet, as a recording medium and provide a program to the computer 1900 via a network.

Various embodiments of this disclosure have been described using particular embodiments, but the technical scope of this disclosure is not limited to the scope described in the above particular embodiments. It will be obvious to those skilled in the art that various modifications and improvements may be made to the above embodiments. It is also obvious from the description of the scope of claims that such modified or improved embodiments are also included in the technical scope of this disclosure.

It should be noted that the order of execution of respective processes in operations, procedures, steps and stages or the like in the apparatus, system, program, and method shown in the scope of claims, specification, and drawings is not explicitly defined, such as "before . . . " or "prior to . . . " or the like in particular, and the processes can be realized in various orders unless the output of a preceding process is used in a subsequent process. Although description is given for convenience using terms like "first" or "next" regarding an operation flow in the scope of claims, specification, and drawings, this does not imply that it is mandatory that the processes should be executed in this order.

What is claimed is:

1. An information processing apparatus comprising:
a memory having computer-readable instructions; and
one or more processors for executing the computer-readable instructions, the computer-readable instructions comprising:
calculating similarity among a plurality of documents;
grouping together into a group two or more documents, among the plurality of documents, having a similarity greater than or equal to the first criterion;
identifying, in response to a change made to a first document, a second document that is in a same group as the first document and has a similarity greater than or equal to a first criterion as compared to the first document before the change; and
notifying a user of the second document that the first document has been changed, in response to the change to the first document.

2. The information processing apparatus according to claim 1, the computer-readable instructions further comprising:
storing identities of respective users associated with the plurality of documents;
acquiring identities of users associated with the identified second document from the user storage section; and
notifying the users of the change made to the first document.

3. The information processing apparatus according to claim 1, the computer-readable instructions further comprising:
maintaining the first document as a document in the group even when, in response to a change made to the first document, a similarity of the first document to one or more other documents in the same group to which the first document belongs is less than the first criterion.

4. The information processing apparatus according to claim 1, the computer-readable instructions further comprising:
based on a set of documents belonging to a first group becoming a subset of a set of documents belonging to a second group, deleting the first group and integrating the first group into the second group.

5. The information processing apparatus according to claim 1, the computer-readable instructions further comprising:
  acquiring a descriptive text that describes changed contents of the first document; and
  notifying the user associated with the second document of the descriptive text.

6. The information processing apparatus according to claim 1, the computer-readable instructions further comprising:
  acquiring necessity information indicating whether one or more other documents need to be changed due to the change to the first document; and
  notifying the user associated with the second document of the necessity information.

7. The information processing apparatus according to claim 1, the computer-readable instructions further comprising generating an updated version of the second document that reflects in the second document the change to the first document, when the similarity between the first document before the change and the second document is greater than or equal to a second criterion, which is higher than the first criterion.

8. The information processing apparatus according to claim 1, the computer-readable instructions further comprising:
  determining whether to notify one or more users associated with the second document of the change to the first document based on an instruction from the user; and
  notifying the user of the change of the first document that the user associated with the second document is not to be notified of the change of the first document.

9. The information processing apparatus according to claim 1, the computer-readable instructions further comprising:
  calculating a similarity between the first document before the change and the changed first document;
  omitting recalculation of a similarity between the first document and one or more other documents on condition that the similarity of the first document before the change as compared to the first document after the change is greater than or equal to a third criterion.

10. The information processing apparatus according to claim 1, wherein the information processing apparatus functions as a management apparatus that manages a plurality of source files created in program development, and the computer-readable instructions further comprising:
  calculating a similarity among the plurality of documents that are at least one or more source codes of the plurality of source files managed by the management apparatus in response to a check made on an updated version of one source file.

11. A method comprising:
  calculating, by a computer processor, similarity among a plurality of documents;
  grouping together into a group two or more documents, among the plurality of documents, having a similarity greater than or equal to the first criterion;
  identifying, in response to a change made to a first document, a second document that is in a same group as the first document and has a similarity greater than or equal to a first criterion as compared to the first document before the change; and
  notifying a user of the second document that the first document has been changed, in response to the change to the first document.

12. The method of claim 11, further comprising:
  maintaining the first document as a document in the group even when, in response to a change made to the first document, a similarity of the first document to one or more other documents in the group to which the first document belongs is less than a first criterion.

13. The method of claim 11, further comprising;
  acquiring a descriptive text that describes changed contents of the first document; and
  notifying the user associated with the second document of the descriptive text.

14. The method of claim 11, further comprising generating an updated version of the second document that reflects in the second document the change to the first document, when the similarity between the first document before the change and the second document is greater than or equal to a second criterion, which is higher than the first criterion.

15. The method of claim 11, further comprising:
  calculating a similarity between the first document before the change and the changed first document; and
  omitting recalculation of a similarity between the first document and one or more other documents on condition that the similarity of the first document before the change as compared to the first document after the change is greater than or equal to a third criterion.

16. A computer program product comprising a non-transitory computer readable storage medium having computer readable program code embodied thereon, the computer readable program code executable by a processor to perform a method comprising:
  calculating similarity among a plurality of documents;
  grouping together into a group two or more documents, among the plurality of documents, having a similarity greater than or equal to the first criterion;
  identifying, in response to a change made to a first document, a second document that is in a same group as the first document and has a similarity equal to or greater than a first criterion to the first document before the change; and
  notifying a user of the second document that the first document has been changed, in response to the change to the first document.

17. The computer program product of claim 16, the method further comprising:
  acquiring a descriptive text that describes changed contents of the first document; and
  notifying the user associated with the second document of the descriptive text.

18. The computer program product of claim 16, the method further comprising generating an updated version of the second document that reflects in the second document the change to the first document, when the similarity between the first document before the change and the second document is greater than or equal to a second criterion, which is higher than the first criterion.

19. The computer program product of claim 16, the method further comprising:
  calculating a similarity between the first document before the change and the changed first document; and
  omitting recalculation of a similarity between the first document and one or more other documents on condition that the similarity of the first document before the change as compared to the first document after the change is greater than or equal to a third criterion.

* * * * *